US008423897B2

(12) United States Patent
Rendahl

(10) Patent No.: US 8,423,897 B2
(45) Date of Patent: Apr. 16, 2013

(54) ONSCREEN KEYBOARD ASSISTANCE METHOD AND SYSTEM

(76) Inventor: Randy Allan Rendahl, Raleigh, NC (US)

( * ) Notice: Subject to any disclaimer, the term of this patent is extended or adjusted under 35 U.S.C. 154(b) by 541 days.

(21) Appl. No.: 12/695,255

(22) Filed: Jan. 28, 2010

(65) Prior Publication Data

US 2011/0181522 A1     Jul. 28, 2011

(51) Int. Cl.
*G06F 3/048* (2006.01)

(52) U.S. Cl.
USPC ............................................. 715/773

(58) Field of Classification Search .............. 715/773, 715/865
See application file for complete search history.

(56) References Cited

U.S. PATENT DOCUMENTS

| | | | | |
|---|---|---|---|---|
| 6,031,531 | A * | 2/2000 | Kimble | 715/862 |
| 6,169,538 | B1 | 1/2001 | Nowlan et al. | |
| 6,934,915 | B2 * | 8/2005 | Rudd et al. | 715/765 |
| 7,048,456 | B2 * | 5/2006 | Keinonen et al. | 400/495 |
| 7,126,587 | B2 * | 10/2006 | Kawakami et al. | 345/168 |
| 7,336,263 | B2 | 2/2008 | Valikangas et al. | |
| 8,018,441 | B2 * | 9/2011 | Shin et al. | 345/173 |
| 2006/0139312 | A1 * | 6/2006 | Sinclair et al. | 345/156 |
| 2007/0174788 | A1 | 7/2007 | Ording et al. | |
| 2007/0239426 | A1 * | 10/2007 | Fux et al. | 704/3 |
| 2009/0135147 | A1 * | 5/2009 | Hsu et al. | 345/173 |
| 2009/0174667 | A1 * | 7/2009 | Kocienda et al. | 345/169 |
| 2009/0207144 | A1 * | 8/2009 | Bridger | 345/173 |
| 2010/0013852 | A1 * | 1/2010 | Liu | 345/592 |
| 2010/0156830 | A1 * | 6/2010 | Homma et al. | 345/173 |
| 2010/0259561 | A1 * | 10/2010 | Forutanpour et al. | 345/660 |

FOREIGN PATENT DOCUMENTS

WO    WO 2008029180    3/2008

OTHER PUBLICATIONS

Microsoft, Microsoft Computer Dictionary, Microsoft Press, Mar. 15, 2002, Print ISBN-10: 0-7356-1495-4, pp. 423 and 720.*

* cited by examiner

*Primary Examiner* — Doon Chow
*Assistant Examiner* — Wilson Varga
(74) *Attorney, Agent, or Firm* — Schmeiser, Olsen & Watts; Anna Linne

(57) ABSTRACT

An assistance method and system. The method includes retrieving by a computer processor of a computing system comprising a touch screen display, an enable command for enabling a keyboard configuration menu for a virtual touch screen keyboard presented by the touch screen of said computing system. The computer processor presents the keyboard configuration menu to the user. The computer processor receives a modify command for modifying specified configuration settings associated with each key of the virtual touch screen keyboard. The computer processor generates and saves modified configuration settings associated with said specified configuration settings. The computer processor disables the keyboard configuration menu.

16 Claims, 10 Drawing Sheets

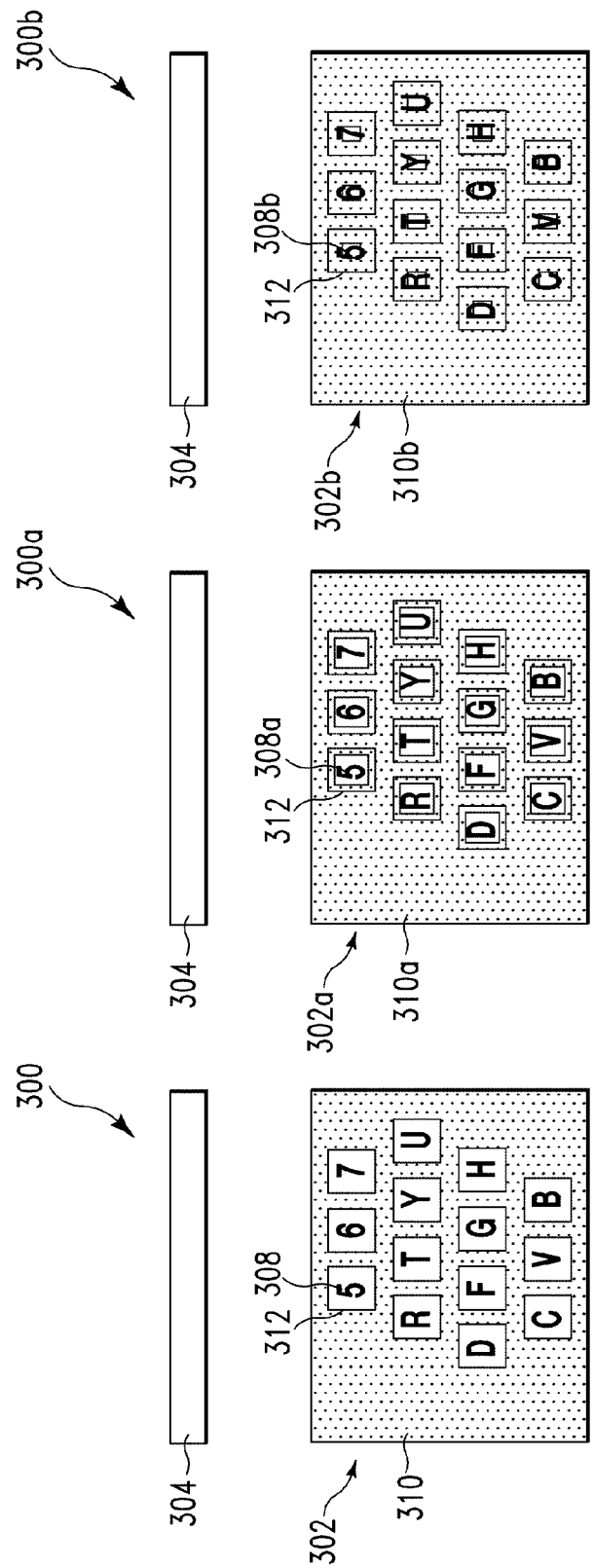

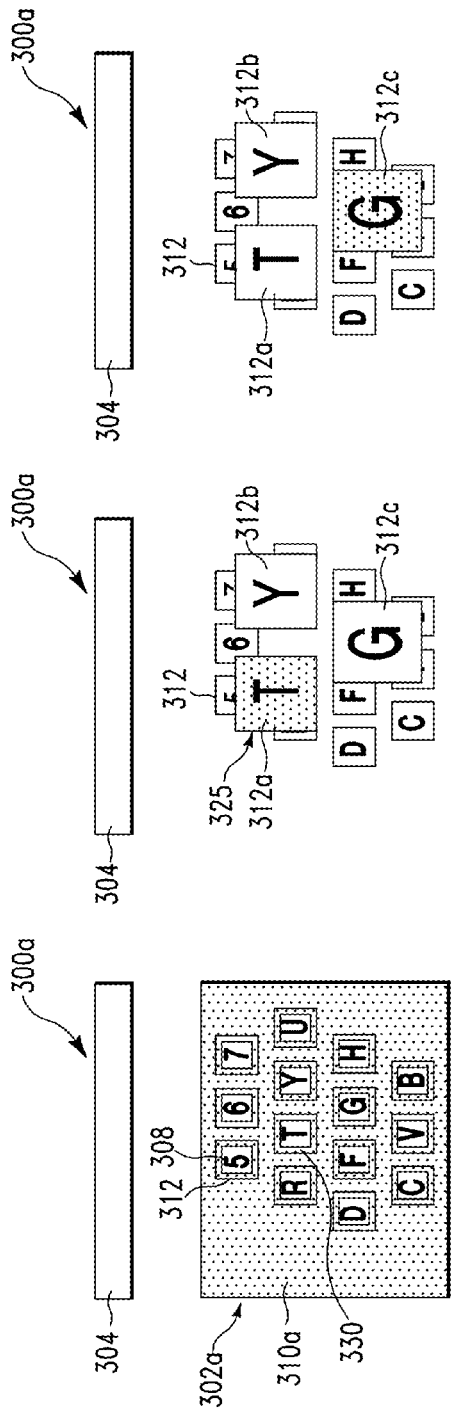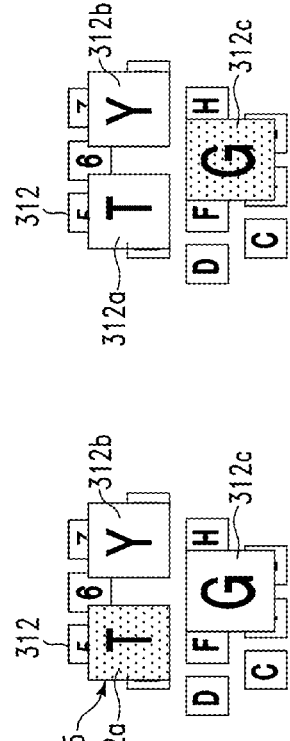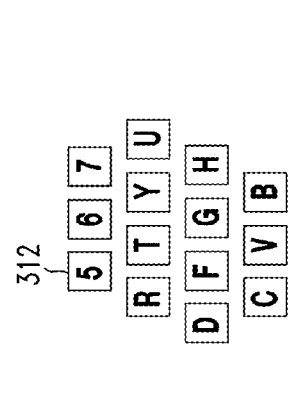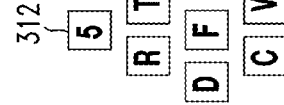

ONSCREEN KEYBOARD ASSISTANCE METHOD AND SYSTEM

FIELD OF THE INVENTION

The present invention relates to a method and associated system for assisting a user to select correct keys from an onscreen keyboard.

BACKGROUND OF THE INVENTION

Selecting appropriate items presented by electrical devices typically comprises an inefficient process with little flexibility. Items presented by electrical devices typically comprise varying characteristics. Varying characteristics may result in incorrect selections.

SUMMARY OF THE INVENTION

The present invention provides a method comprising:

receiving from a user, by a computer processor of a computing system comprising a touch screen display, a first enable command for enabling a keyboard configuration menu for a virtual touch screen keyboard presented by said touch screen of said computing system, said keyboard configuration menu comprising user adjustable configuration settings for key proximity sensitivity settings associated with said virtual touch screen keyboard;

presenting, by said computer processor to said user via said touch screen display in response to said first enable command, said keyboard configuration menu;

receiving, by said computer processor from said user via said configuration menu, a first modify command for modifying first specified configuration settings associated with each key of said virtual touch screen keyboard;

generating, by said computer processor in response to said first modify command, first modified configuration settings associated with said first specified configuration settings;

saving, by said computer processor, said first modified configuration settings; and disabling, by said computer processor in response to said saving said first modified configuration settings, said keyboard configuration menu.

The present invention provides a method comprising:

receiving from a user, by a computer processor of a computing system comprising a touch screen display, a first enable command for enabling a keyboard configuration menu for a virtual touch screen keyboard presented by said touch screen of said computing system, said keyboard configuration menu comprising user adjustable configuration settings for key proximity sensitivity settings associated with said virtual touch screen keyboard;

presenting, by said computer processor to said user via said touch screen display in response to said first enable command, said keyboard configuration menu;

receiving, by said computer processor from said user via said configuration menu, a first modify command for enabling a learning mode associated with first specified configuration settings associated with said key proximity sensitivity settings for each key of said virtual touch screen keyboard;

receiving, by said computer processor from said user via said configuration menu, first learning threshold settings associated with modifying said first specified configuration settings;

saving, by said computer processor, said first learning threshold settings; and disabling, by said computer processor in response to said saving said first learning threshold settings, said keyboard configuration menu.

The present invention advantageously provides a simple method and associated system capable of selecting appropriate items presented by electrical devices.

BRIEF DESCRIPTION OF THE DRAWINGS

FIG. 3A illustrates a touch screen comprising a first configured touch screen keyboard, in accordance with embodiments of the present invention.

FIG. 3B illustrates a first alternative touch screen to the touch screen of FIG. 3A, in accordance with embodiments of the present invention.

FIG. 3C illustrates a second alternative touch screen to the touch screen of FIG. 3A, in accordance with embodiments of the present invention.

FIGS. 3D-3G illustrate a process using the configured touch screen of FIG. 3B to enlarge a group of keys, in accordance with embodiments of the present invention.

DETAILED DESCRIPTION OF THE INVENTION

Figure 1:
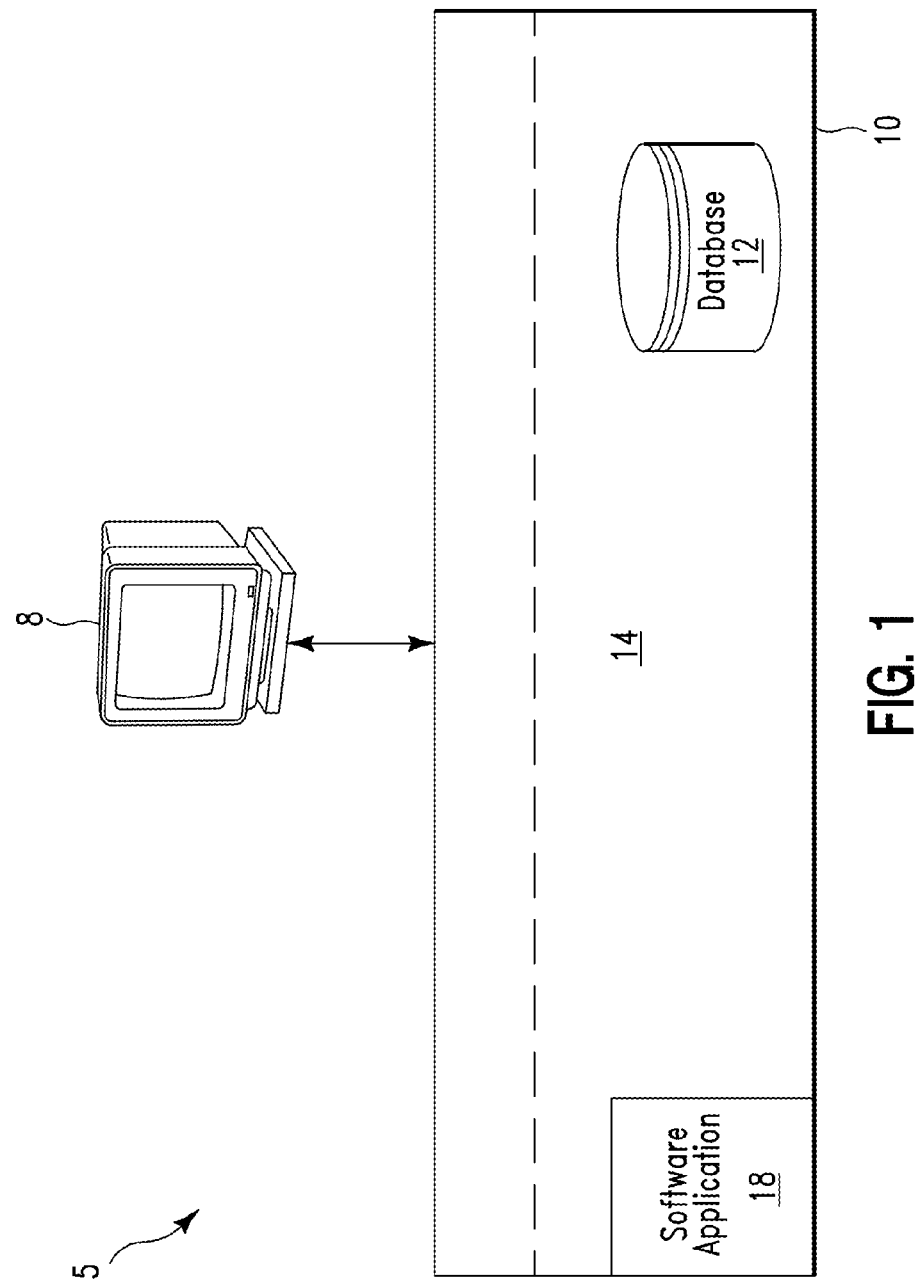
FIG. 1 illustrates a system for modifying configuration settings associated with selecting keys from a touch screen keyboard, in accordance with embodiments of the present invention.

FIG. 1 illustrates a system 5 for modifying configuration settings associated with selecting keys from a touch screen keyboard, in accordance with embodiments of the present invention. A user may manually modify configuration settings associated with selecting keys from a touch screen keyboard may. Alternatively, a computing system (e.g., computing system 10 in FIG. 1) may enable an automated process (i.e., an automated modification mode) for modifying configuration settings associated with selecting keys from a touch screen keyboard. A touch screen is defined herein as an (virtual) interface (i.e., enabled by user touch) between a user and a virtual input device (e.g., a keyboard, an input selection panel, on screen objects, etc) displayed on a monitor (or display device). The touch screen may comprise a touch sensitive transparent panel covering a viewable portion of a monitor. A touch screen enables a user to select objects on a screen using fingers instead of using a mouse or a keyboard. A touch screen keyboard is defined herein as an (virtual) keyboard (i.e., enabled by a user touch) displayed on and enabled by a touch screen. A touch screen keyboard typically comprises a relatively small keyboard as compared to a user's fingers and therefore incorrect keys may be inadvertently selected. Utilizing a touch screen keyboard depends on a user touching a specific area of the screen to represent each key. In cases where the user doesn't hit the exact area expected or hits a broad area, it is difficult to determine an intended key on the touch screen keyboard. System 5 provides a magnified or enlarged view of a subsection (e.g., a couple of keys) of the touch screen keyboard when the user provides an ambiguous input (e.g., hitting or enabling multiple keys or boundary areas). When the magnified view comes up, if the correct key isn't highlighted, the user may slide their thumb (or finger, stylus, etc) from a center of the magnified area to a correct key. The touch screen keyboard tracks the movement and captures the key indicated. System 5 enables a means for enlarging specified keys on a touch screen keyboard when the user touches a location near a key on the touch screen keyboard. The enlarged keys allow a user to easily select a correct key. Additionally, system 5 allows a user (or a computing system) to adjust sensitivity for control of enlarging specified keys. System 5 enables a location interpretation process that allows a fuzzy selection where areas of the touch screen keyboard are considered ambiguous. While a magnification phase of the specified enlarged keys is active, touch zones are automatically updated so the enlarged key areas map to the reduced key set. Upon finger lifting, the magnified area would immediately disappear and the original keyboard size restored. System 5 allows device level settings to be adjusted to narrow or broaden the area that is considered ambiguous. Expert users may essentially eliminate the ambiguous zone and count on their own accuracy and any built in auto-correct features. Alternatively, novice users may start with a fairly broad area of ambiguity and then narrow the area as they improve accuracy and want to avoid the distraction of the magnification. System 5 helps the user understand as their accuracy improves based on the frequency that the magnification has preselected the correct key.

System 5 of FIG. 1 comprises a touch screen monitor 8 connected to a computing system 10. Touch screen monitor 8 and computing system 10 may be comprised by a same device such as, inter alia, cellular telephone, a digital assistant (PDA), a video game system, an audio/video player, a personal computer, a laptop computer, a computer terminal, etc. Touch screen monitor 8 is used by end users for communicating with computing system 10. Touch screen monitor 8 is used to enable a touch screen keyboard and a sensitivity configuration menu for adjusting a sensitivity of magnification of the touch screen keyboard. Computing system 10 may comprise any type of computing system(s) including, inter alia, a personal computer (PC), a server computer, a database computer, etc. Computing system 10 is used to implement the sensitivity configuration menu. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all saved sensitivity settings. Software application 18 enables a method to:

1. Allow a user to manually adjust sensitivity levels.
2. Enable an automatic method for adjusting sensitivity levels based on past user key selection corrections.

Software application 18 enables the following processes for adjusting a sensitivity of magnification of the touch screen keyboard and usage of the touch screen keyboard after the sensitivity has been adjusted.

Process 1

1. A user enables a keyboard configuration settings menu in order to adjust a (key proximity) sensitivity of an interface (i.e., a touch screen keyboard) to determine whether a touch is ambiguous.
2. The user selects (i.e., on the configuration settings menu) a configuration option for adjusting the sensitivity. The sensitivity may be adjusted by many methods including the following examples:
   A. The user enables a virtual slider (such as a volume control comprising numeric inputs) or a numeric input of 0 (e.g., a range from 0 (indicating no enlargement) to 100 (always enlarge) where the number indicates a distance from an edge to a middle of a key in percent that results in the enlarged keys.
   B. The user may select from discrete options such as: Expert, Skilled, Novice, etc.
   C. The user may use a visual of the key to size the area that is a sure touch (e.g., a resizing square within the key similar to the white squares in FIG. 2 as illustrated in FIGS. 3A-3C, infra).
3. The user saves the updated configuration settings in the device configuration storage.
4. The user enables the touch screen keyboard and touches a key.
5. Software application 18 retrieves sensitivity settings from the updated configuration settings.
6. Software application 18 determines that the touch is in an ambiguous zone.
7. Software application 18 enlarges a group of keys in accordance with the sensitivity settings from the updated configuration settings.
8. The user touches (i.e., selects) one of the keys from the group of keys.
9. Software application 18 places the selected key in an input field. The character may be visible or masked (i.e., for security).

The aforementioned steps may be repeated by the user to change the keyboard configuration (sensitivity) settings. Additionally, software application 18 may enable an automated process for automatically changing the keyboard configuration (sensitivity) settings based on past user modified keyboard configuration (sensitivity) settings as described in process 2.

Process 2

1. A user enables a keyboard configuration settings menu in order to adjust a (key proximity) sensitivity of an interface (i.e., a touch screen keyboard) to determine whether a touch is ambiguous.
2. The user selects (i.e., on the configuration settings menu) a configuration option for enabling a learning mode for automatically adjusting the sensitivity (ambiguous zone). The sensitivity may be adjusted by many methods including the following examples:
   A. The user enables a virtual slider (such as a volume control comprising numeric inputs) or a numeric input of 0 (e.g., a range from 0 (indicating no enlargement) to 100 (always enlarge) where the number indicates a percentage of enlarged keyboard sections that resulted in user initiated corrections.
   B. The user may select from discrete options such as: Strict (15%), Moderate (30%), Forgiving (50%), etc.

3. The user saves the updated configuration settings in the device configuration storage.
4. Software application 18 enables a learning mode.
5. Software application 18 retrieves and reviews logged history of user key strike (i.e., on the touch screen keyboard) corrections and overall key usage (i.e., associated with an enlarged keyboard).
6. Software application 18 adjusts the (key proximity) sensitivity of the touch screen keyboard and determines an updated ambiguous zone.

Figure 2:
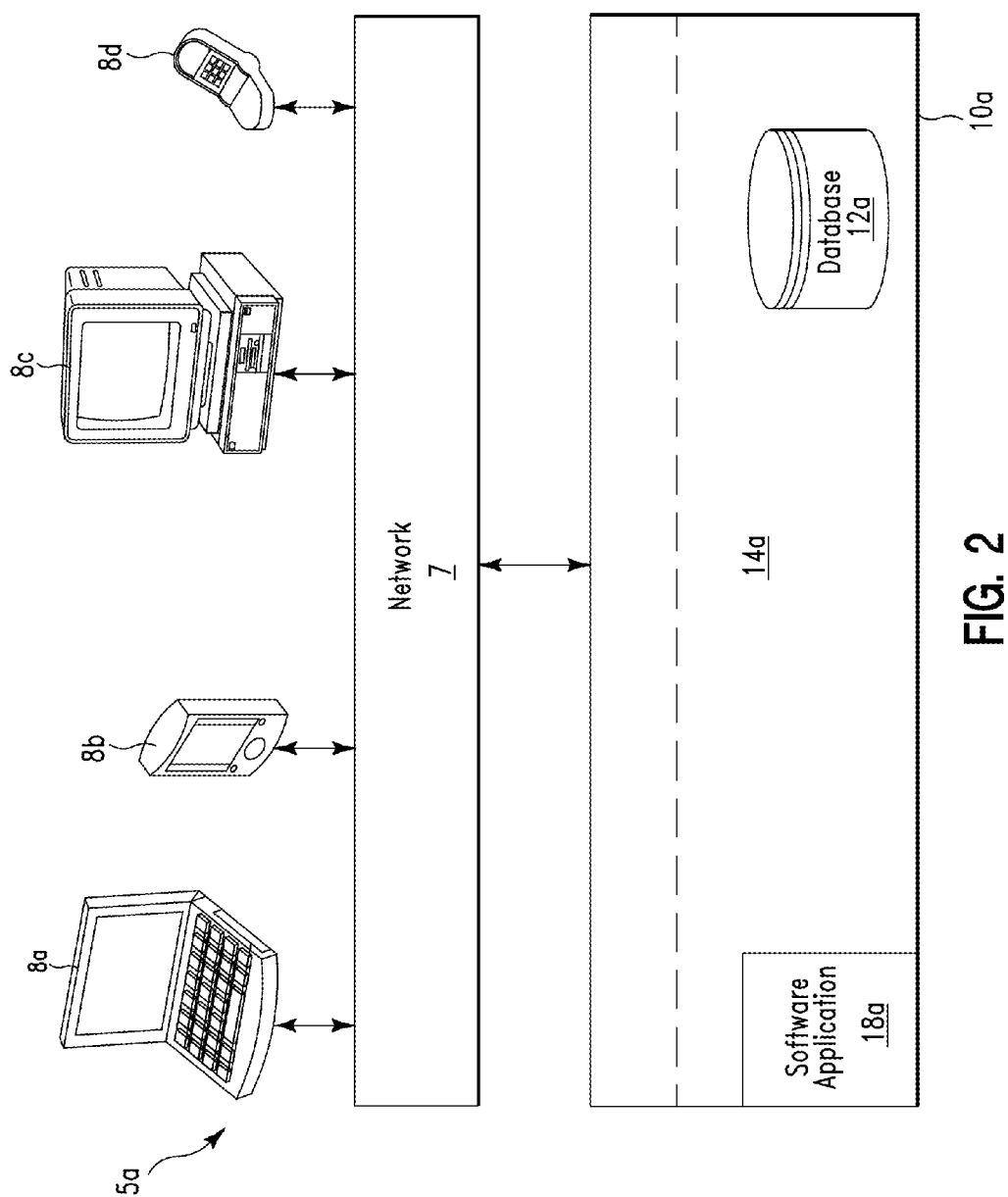
FIG. 2 illustrates an alternative system to the system of FIG. 1, in accordance with embodiments of the present invention.

FIG. 2 illustrates an alternative system 5a to the system 5 of FIG. 1, in accordance with embodiments of the present invention. In contrast to system 5 of FIG. 1, system 5a of FIG. 2 comprises devices 8a . . . 8n connected through a network 7 to a computing system 10a. System 5 comprises a central computing system 10a for enabling a method for modifying configuration settings associated with selecting keys from a touch screen keyboard (i.e., instead of each individual device). Network 7 may comprise any type of network including, inter alia, a telephone network, a cellular telephone network, a local area network, (LAN), a wide area network (WAN), the Internet, etc. Devices 8a . . . 8n may comprise any type of devices comprising a touch screen display such as, inter alia, cellular telephone, a digital assistant (PDA), a video game system, an audio/video player, a personal computer, a laptop computer, a computer terminal, etc. Each of devices 8a . . . 8n may comprise a single device or a plurality of devices. Devices 8a . . . 8n are used by end users for enabling a touch screen keyboard and a sensitivity configuration menu for adjusting a sensitivity of magnification of the touch screen keyboard (i.e., in combination with computing system 10a). Computing system 10a may comprise any type of computing system(s) including, inter alia, a personal computer (PC), a server computer, a database computer, etc. Computing system 10a is used to coordinate devices 8a . . . 8n and generate the sensitivity configuration menu for adjusting a sensitivity of magnification of the touch screen keyboard and measure and monitor a social network marketing plan implemented using devices 8a . . . 8n. Computing system 10a comprises a memory system 14a. Memory system 14a may comprise a single memory system. Alternatively, memory system 14 may comprise a plurality of memory systems. Memory system 14a comprises a shared software application 18a and a shared database 12a. Shared software application 18a and shared database 12a are shared by devices 8a . . . 8n. Database 12 comprises all saved sensitivity settings for all of devices 8a . . . 8n.

FIG. 3A illustrates a touch screen 300 comprising a first configured touch screen keyboard 302, in accordance with embodiments of the present invention. Touch screen 300a comprises an input field 304 and first configured touch screen keyboard 302 comprising keys 312 (i.e., comprising characters). First configured touch screen keyboard 302 illustrates a shaded ambiguous zone 310 (i.e., where a user touch command results in an enlarged group of keys 312) and un-shaded non-ambiguous zone 308 (i.e., indicating a definitive user key selection). Un-shaded non-ambiguous zone 308 indicated that any touch within any key 312 comprises a definitive user key selection.

FIG. 3B illustrates a first alternative touch screen 300a to touch screen 300 of FIG. 3A, in accordance with embodiments of the present invention. Touch screen 300a comprises input field 304 and a second configured touch screen keyboard 302a comprising keys 312. Second configured touch screen keyboard 302a illustrates a shaded ambiguous zone 310a (i.e., where a user touch command results in an enlarged group of keys 312) and un-shaded non-ambiguous zone 308a (i.e., indicating a definitive user key selection). Un-shaded non-ambiguous zone 308a indicates that only a touch within the un-shaded portion of any key 312 comprises a definitive user key selection.

FIG. 3C illustrates a second alternative touch screen 300b to touch screen 300 of FIG. 3A, in accordance with embodiments of the present invention. Touch screen 300b comprises input field 304 and a third configured touch screen keyboard 302b comprising keys 312. Second configured touch screen keyboard 302b illustrates a shaded ambiguous zone 310b (i.e., where a user touch command results in an enlarged group of keys 312) and un-shaded non-ambiguous zone 308b (i.e., indicating a definitive user key selection). Un-shaded non-ambiguous zone 308b indicates that only a touch within the very small un-shaded portion of any key 312 comprises a definitive user key selection.

FIGS. 3D-3G illustrate a process using configured touch screen 300a of FIG. 3B to enlarge a group of keys 325, in accordance with embodiments of the present invention. FIG. 3D illustrates a user touching section 330 (i.e., near the character "T") of shaded ambiguous zone 310b. FIG. 3E illustrates group of keys 325 (i.e., keys that are closest to section 330 of shaded ambiguous zone 310b) enlarged. Group of keys 325 comprises key 312a (i.e., "T"), key 312b (i.e., "Y"), and key 312c (i.e., "G"). In FIG. 3E, key 312a is shaded or highlighted indicating that the computing system (e.g., computing system 10 of FIG. 1) has selected key 312a due to its proximity to the user touching section 330. FIG. 3F illustrates the user shifting the touch command to key 312c thereby causing key 312c to be shaded (i.e., indicating a user specified correct key). FIG. 3G illustrates the user lifting a finger (i.e., the touch command) from the keys 312 thereby causing the correct user selected character "G" to be placed in input field 304.

Figure 4:
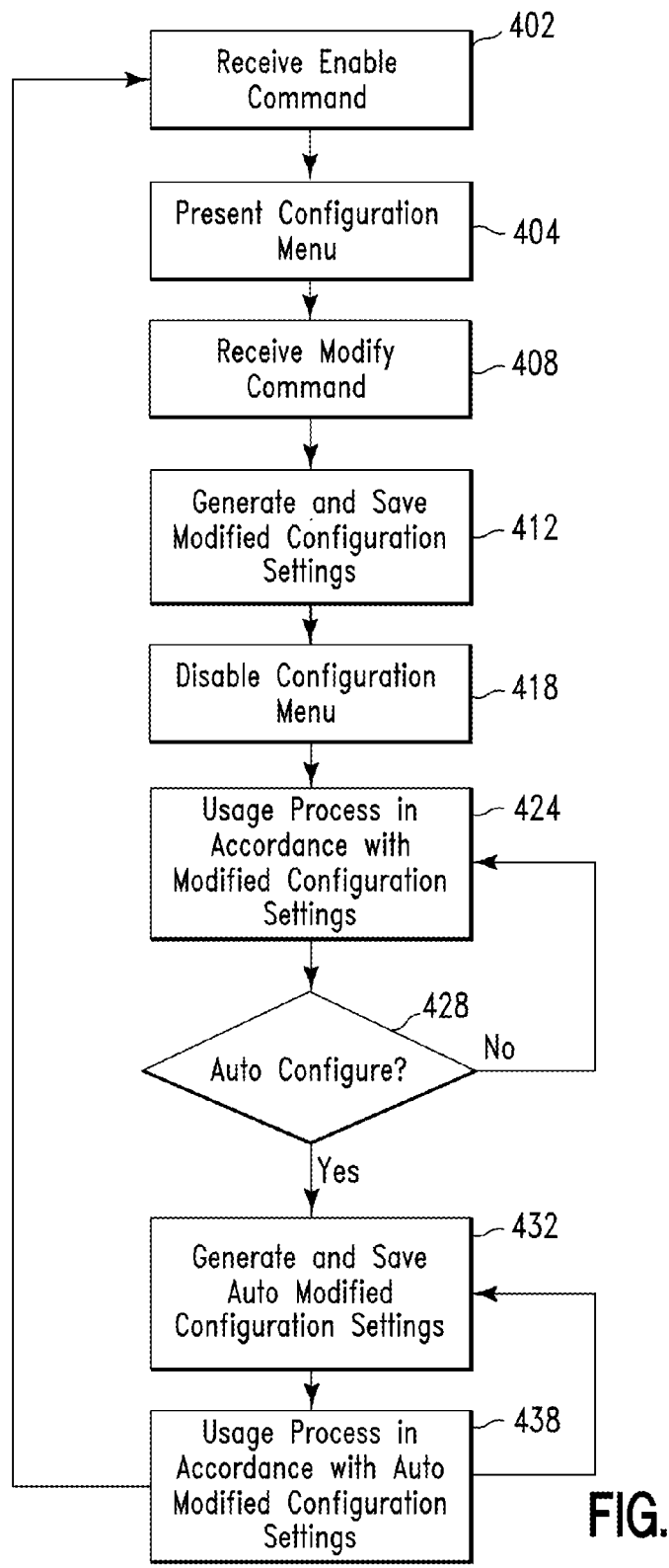
FIG. 4 illustrates a flowchart describing an algorithm used by the system of FIG. 1 for modifying configuration settings associated with selecting keys from a touch screen keyboard, in accordance with embodiments of the present invention.

FIG. 4 illustrates a flowchart describing an algorithm used by system 5 of FIG. 1 for modifying configuration settings associated with selecting keys from a touch screen keyboard, in accordance with embodiments of the present invention. In step 402, a computing system (e.g., computing system 10 of FIG. 1) comprising a touch screen display receives (i.e., from a user) an enable command for enabling a keyboard configuration menu for a virtual touch screen keyboard presented by the touch screen display. The keyboard configuration menu comprises user adjustable configuration settings for key proximity sensitivity settings associated with the virtual touch screen keyboard. In step 404, the computing system presents (to the user via the touch screen display in response to the enable command) the keyboard configuration menu. In step 408, the computing system receives (from the user via the configuration menu) a modify command for modifying specified configuration settings associated with each key of the virtual touch screen keyboard. The specified configuration settings may include, inter alia, a specified range of numerical settings associated with distances from edges of the touch screen display (e.g., the specified configuration settings may be selected by selecting numerical settings from the specified range of numerical settings using a virtual selection tool within the keyboard configuration menu), discrete character defined settings associated with a skill level of the user (e.g., the specified configuration settings may be selected by selecting a first discrete character defined setting of the discrete character defined settings using a virtual selection tool within the keyboard configuration menu), etc. In step 412, the computing system generates and saves modified configuration settings associated with the specified configuration settings. In step 418, the computing system disables the keyboard configuration menu. In step 424, the computing system performs a usage process associated with the modified configuration settings as described in detail with respect to FIG. 5, infra. The usage process may be repeated any number of times during different time intervals. In step 428, it is determined if an auto configure process (i.e., for automatically generating modified configuration settings) will be enabled. If in step 428, it is determined that an auto configure process will not be enabled then step 424 is repeated for performing the usage process. If in step 428, it is determined that an auto configure process will be enabled then in step 432, the computing system generates and saves auto modified configuration settings associated with the specified configuration settings as described in detail with respect to FIG. 6, infra. In step 438, the computing system performs a usage process associated with the auto modified configuration settings as described in detail with respect to FIG. 7, infra. The usage process of step 438 may be repeated periodically any number of times during different time intervals using the manual configuration process (i.e., starting with step 402) and/or the automatic configuration process (i.e., step 432) may be repeated as necessary.

Figure 5:
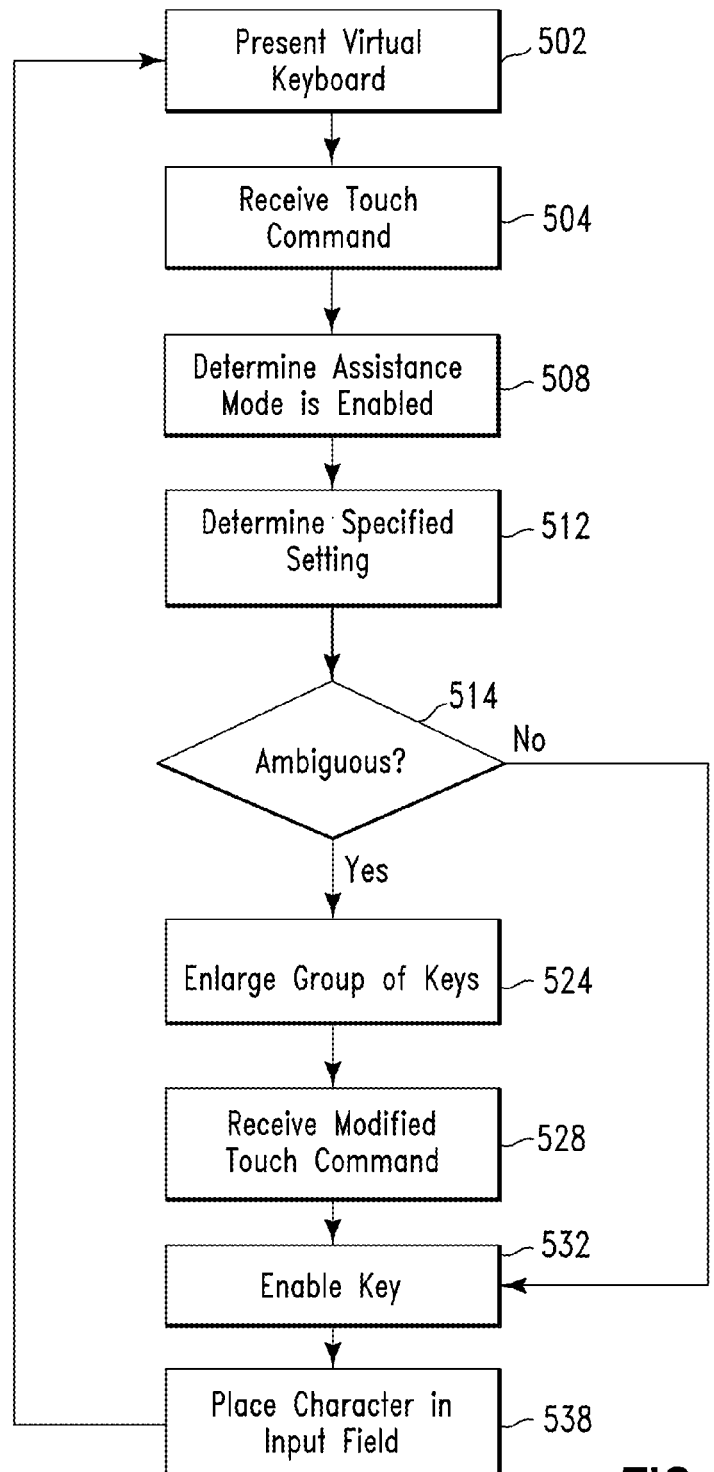
FIG. 5 illustrates a flowchart detailing a step of the algorithm of FIG. 4, in accordance with embodiments of the present invention.

FIG. 5 illustrates a flowchart detailing step 424 of the algorithm of FIG. 4, in accordance with embodiments of the present invention. In step 502, the computing system presents (i.e., to a user via the touch screen display) the virtual touch screen keyboard. In step 504, the computing system receives (i.e., from the user via the touch screen display) a touch command for enabling a key of the virtual touch screen keyboard. In step 508, the computing system determines that a virtual keyboard assistance mode is enabled. The virtual keyboard assistance mode is associated with assisting the user with enabling a correct key of the virtual touch screen keyboard. In step 512, the computing system determines a specified setting associated with the modified configuration settings (i.e., from step 412 of FIG. 4) and the virtual keyboard assistance mode. In step 514, it is determined if the touch command comprises a first ambiguous command associated with a first ambiguous zone. If in step 514, it is determined that the touch command does not comprise a first ambiguous command associated with a first ambiguous zone then step 532 is enabled (i.e., a key of the virtual touch screen keyboard is enabled) as described infra. If in step 514, it is determined that the touch command does comprise a first ambiguous command associated with a first ambiguous zone then in step 524, the computing system enlarges a first plurality of keys of the virtual touch screen keyboard. The first plurality of keys is selected based on the specified setting and the touch command. In step 528, the computing system receives (from the user via the touch screen display), a modified touch command associated with the touch command. In step 532, the computing system enables (in response to the modified touch command) a first key of the plurality of keys. In step 538, the computing system places (i.e., in response to enabling the first key) a first character in an input field presented by the touch screen display) and step 504 is repeated. The first character is the character associated with the first key.

Figure 6:
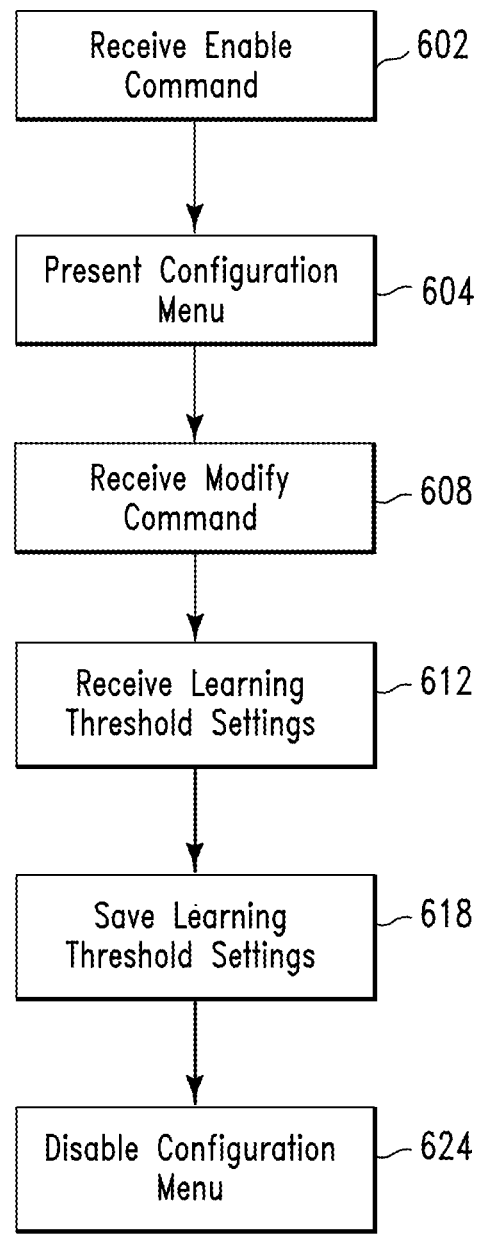
FIG. 6 illustrates a flowchart detailing an additional step of the algorithm of FIG. 4, in accordance with embodiments of the present invention.

FIG. 6 illustrates a flowchart detailing step 432 of the algorithm of FIG. 4, in accordance with embodiments of the present invention. In step 602, the computing system receives (i.e., from the user via the touch screen display) an enable command for enabling the keyboard configuration menu. In step 604, the computing system presents (i.e., to the user via the touch screen display) the keyboard configuration menu. In step 608, the computing system receives (via the configuration menu) a modify command for enabling a learning mode associated with specified configuration settings (i.e., associated with the key proximity sensitivity settings for each key of the virtual touch screen keyboard). In step 612, the computing system receives learning threshold settings associated with modifying the specified configuration settings. In step 618, the computing system saves the learning threshold settings. In step 624, the computing system disables the keyboard configuration menu.

Figure 7:
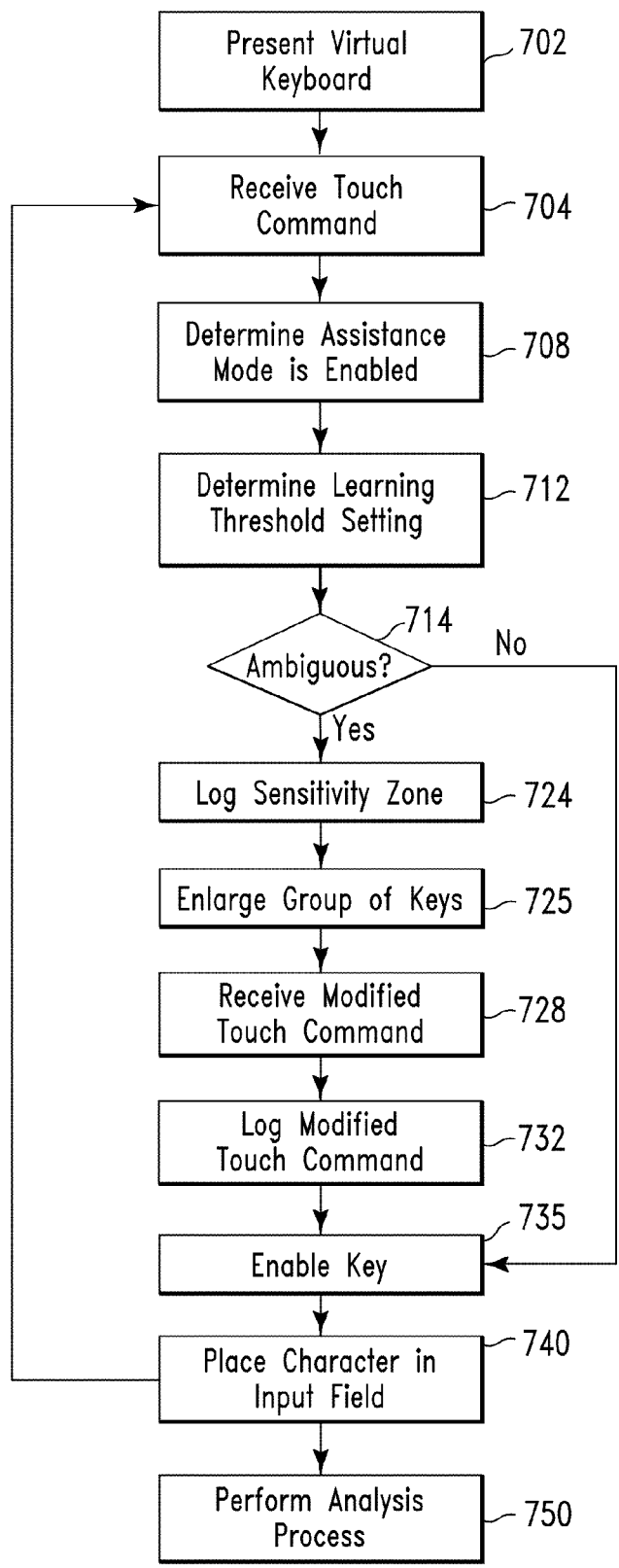
FIG. 7 illustrates a flowchart detailing an additional step of the algorithm of FIG. 4, in accordance with embodiments of the present invention.

FIG. 7 illustrates a flowchart detailing step 438 of the algorithm of FIG. 4, in accordance with embodiments of the present invention. In step 702, the computing system presents (i.e., to the user via the touch screen display) the virtual touch screen keyboard. In step 704, the computing system receives (i.e., from the user via the touch screen display) a touch command for enabling a key of the virtual touch screen keyboard. In step 708, the computing system determines that a virtual keyboard assistance mode is enabled. The virtual keyboard assistance mode is associated with assisting the user with enabling a correct key of the virtual touch screen keyboard. In step 712, the computing system determines a learning threshold setting. In step 712, it is determined if the touch command comprises a second ambiguous command associated with a second ambiguous zone. If in step 712, it is determined that the touch command does not comprise a second ambiguous command associated with a second ambiguous zone then step 735 is enabled (i.e., a key of the virtual touch screen keyboard is enabled) as described infra. If in step 712, it is determined that the touch command does comprise a second ambiguous command associated with a second ambiguous zone then in step 724, the computing system logs a first sensitivity zone associated with the learning threshold setting and the touch command (i.e., received in step 704). In step 725, the computing system enlarges a plurality of keys of the virtual touch screen keyboard. The plurality of keys selected based on the first sensitivity zone and the touch command. In step 728, the computing system receives (i.e., from the user via the touch screen display in response to the enlarging a modified touch command associated with the touch command (i.e., received in step 704). In step 732, the computing system logs the modified touch command. In step 735, the computing system enables (i.e., in response to the modified touch command) a first key of the plurality of keys. In step 740, the computing system places a character in the input field presented by the touch screen display and step 704 is repeated until the user has completed a process for placing characters in the input field. The characters are the characters associated with the keys. In step 750 (i.e., after the user has completed a process for placing characters in the input field during one or more time intervals), the computing system performs an analysis process as described, with respect to FIG. 8, infra.

Figure 8:
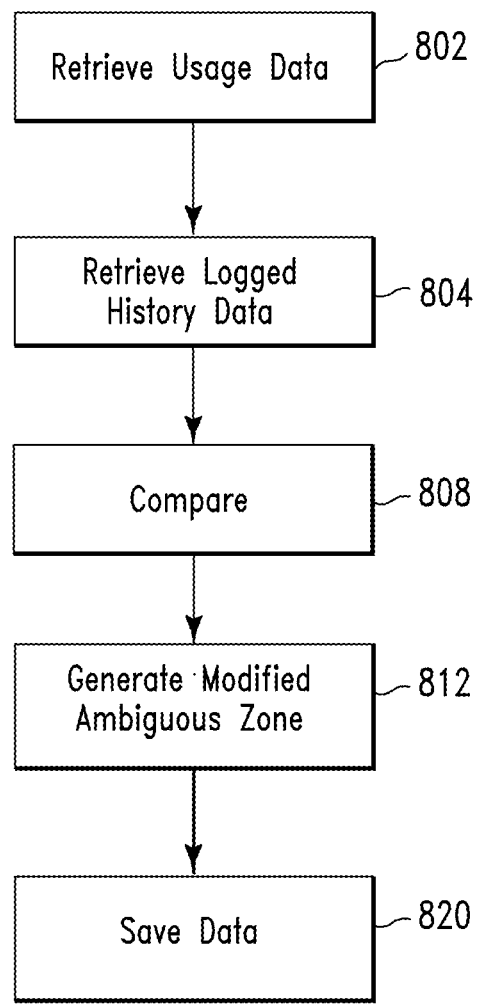
FIG. 8 illustrates a flowchart detailing a step of the algorithm of FIG. 7, in accordance with embodiments of the present invention.

FIG. 8 illustrates a flowchart detailing step 750 of the algorithm of FIG. 7, in accordance with embodiments of the present invention. In step 802, the computing system retrieves usage data comprising data associated with the learning threshold settings, the first sensitivity zone, the second ambiguous zone, the modified touch command, and the touch command. In step 804, the computing system retrieves logged history data associated with key stroke corrections, keystroke usage, and past ambiguous zones for the virtual touch screen keyboard. In step 808, the computing system compares the usage data to the logged history data. In step 812, the computing system generates (i.e., based on results of the comparison process of step 808) a modified ambiguous zone. In step 820, the computing system saves data associated with the modified ambiguous zone.

Figure 9:
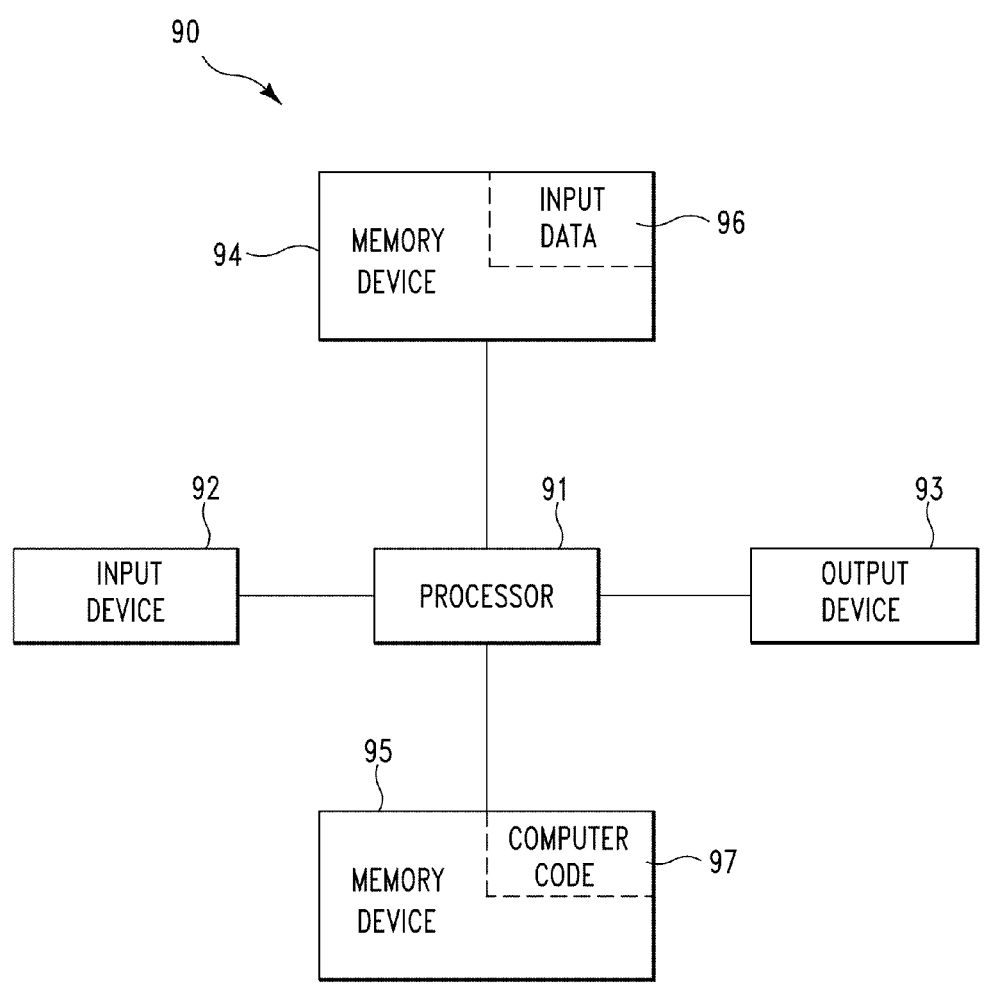
FIG. 9 illustrates a computer apparatus used for modifying configuration settings associated with selecting keys from a touch screen keyboard, in accordance with embodiments of the present invention.

FIG. 9 illustrates a computer apparatus 90 (e.g., computing system 10 of FIG. 1) used for modifying configuration settings associated with selecting keys from a touch screen keyboard, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4-8) for modifying configuration settings associated with selecting keys from a touch screen keyboard. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may comprise the algorithms of FIGS. 4-8 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to modify configuration settings associated with selecting keys from a touch screen keyboard. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for modifying configuration settings associated with selecting keys from a touch screen keyboard. In another embodiment, the invention provides a method that performs the process steps of the invention on a subscription, advertising, and/or fee basis. That is, a service provider, such as a Solution Integrator, could offer to modify configuration settings associated with selecting keys from a touch screen keyboard. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving from a user, by a computer processor of a computing system comprising a touch screen display, a first enable command for enabling a keyboard configuration menu for a virtual touch screen keyboard presented by said touch screen of said computing system, said keyboard configuration menu comprising user adjustable configuration sensitivity settings and automatic adjustable configuration sensitivity settings for key proximity sensitivity settings associated with said virtual touch screen keyboard, wherein said automatic adjustable configuration sensitivity settings are configured to automatically adjust sensitivity levels of said sensitivity settings based on past user key selection corrections;
presenting, by said computer processor to said user via said touch screen display in response to said first enable command, said keyboard configuration menu;
receiving, by said computer processor from said user via said configuration menu, a first modify command for modifying first specified configuration settings associated with each key of said virtual touch screen keyboard;
generating, by said computer processor in response to said first modify command, first modified configuration settings associated with said first specified configuration settings;
saving, by said computer processor, said first modified configuration settings;
disabling, by said computer processor in response to said saving said first modified configuration settings, said keyboard configuration menu;
presenting, by said computer processor to said user via said touch screen display, said virtual touch screen keyboard;
receiving, by said computer processor from said user via said touch screen display, a first touch command for enabling a key of said virtual touch screen keyboard;
determining, by said computer processor, that a virtual keyboard assistance mode is enabled, said virtual keyboard assistance mode associated with assisting said user with enabling a correct key of said virtual touch screen keyboard;
determining, by said computer processor, a first specified setting associated with said first modified configuration settings and said virtual keyboard assistance mode;
determining, by said computer processor, that said first touch command comprises a first ambiguous command associated with a first ambiguous zone, wherein said first ambiguous zone comprises an area on said touch screen display that is adjacent to said first plurality of keys and includes a portion of each key of said first plurality of keys, and wherein each said portion consists of an entire portion of each said key that completely surrounds but does not include a character on each said key;
enlarging, by said computer processor, a first plurality of keys of said virtual touch screen keyboard, said first plurality of keys selected based on said first specified setting and said first touch command;
receiving, by said computer processor from said user via said touch screen display in response to said enlarging, a first modified touch command associated with said first touch command;
enabling, by said computer processor in response to said first modified touch command a first key of said first plurality of keys; and placing, by said computer processor in response to said enabling said first key of said first plurality of keys, a first character in an input field presented by said touch screen display, said first character associated with said first key of said first plurality of keys.

2. The method of claim 1, further comprising:
receiving from said user, by said computer processor, a second enable command for enabling said keyboard configuration menu for said virtual touch screen keyboard;
presenting, by said computer processor to said user via said touch screen display in response to said second enable command, said keyboard configuration menu;
receiving, by said computer processor from said user via said configuration menu, a second modify command for modifying said first modified configuration settings;
generating, by said computer processor in response to said second modify command, second modified configuration settings associated with said first specified configuration settings, wherein said second modified configuration settings differ from said first modified configuration settings;
saving, by said computer processor, said second modified configuration settings; and
disabling, by said computer processor in response to said saving said second modified configuration settings, said keyboard configuration menu.

3. The method of claim 2, further comprising:
presenting, by said computer processor to said user via said touch screen display, said virtual touch screen keyboard;
receiving, by said computer processor from said user via said touch screen display, a second touch command for enabling a key of said virtual touch screen keyboard;
determining, by said computer processor, that said virtual keyboard assistance mode is enabled;
determining, by said computer processor, a second specified setting associated with said second modified configuration settings and said virtual keyboard assistance mode;
determining, by said computer processor, that said second touch command comprises a second ambiguous command associated with a second ambiguous zone differing from said first ambiguous zone;
enlarging, by said computer processor, a second plurality of keys of said virtual touch screen keyboard, said second plurality of keys selected based on said second specified setting and said second touch command;
receiving, by said computer processor from said user via said touch screen display in response to said enlarging said second plurality of keys, a second modified touch command associated with said second touch command;
enabling, by said computer processor in response to said second modified touch command a first key of said second plurality of keys; and
placing, by said computer processor in response to said enabling said first key of said second plurality of keys, a second character in said input field presented by said touch screen display, said second character associated with said first key of said second plurality of keys.

4. The method of claim 3, further comprising:
automatically enabling, by said computer processor, an automated modification mode;
disabling, by said computer processor in response to said automated modification mode, said touch screen display;
automatically generating, by said computer processor in response to said automated modification mode, third modified configuration settings based on said first modified configuration settings and said second modified configuration settings, wherein said third modified configuration settings differ from said first modified configuration settings and said second modified configuration settings;
saving, by said computer processor, said third modified configuration settings; and
disabling, by said computer processor in response to said saving said third modified configuration settings, said automated modification mode.

5. The method of claim 4, further comprising:
enabling, by said computer processor, said touch screen display;
presenting, by said computer processor to said user via said touch screen display, said virtual touch screen keyboard;
receiving, by said computer processor from said user via said touch screen display, a third touch command for enabling a key of said virtual touch screen keyboard;
determining, by said computer processor, that said virtual keyboard assistance mode is enabled;
determining, by said computer processor, a third specified setting associated with said third modified configuration settings and said virtual keyboard assistance mode;
determining, by said computer processor, that said third touch command comprises a third ambiguous command associated with a third ambiguous zone differing from said first ambiguous zone and said second ambiguous zone;
enlarging, by said computer processor, a third plurality of keys of said virtual touch screen keyboard, said third plurality of keys selected based on said third specified setting and said third touch command;
receiving, by said computer processor from said user via said touch screen display in response to said enlarging said third plurality of keys, a third modified touch command associated with said third touch command;
enabling, by said computer processor in response to said third modified touch command, a first key of said third plurality of keys; and
placing, by said computer processor in response to said enabling said first key of said third plurality of keys, a third character in said input field presented by said touch screen display, said third character associated with said first key of said third plurality of keys.

6. The method of claim 1, further comprising:
presenting, by said computer processor to said user via said touch screen display, said virtual touch screen keyboard;
receiving, by said computer processor from said user via said touch screen display, a second touch command for enabling a key of said virtual touch screen keyboard;
determining, by said computer processor, that said virtual keyboard assistance mode is enabled;
determining, by said computer processor, that said second touch command comprises a same command as said first touch command;
determining by said computer processor based on said first modified configuration settings, that said second touch command does not comprise an ambiguous command associated with any ambiguous zone;
enabling, by said computer processor in response to said second touch command said first key of said first plurality of keys; and
placing, by said computer processor in response to said enabling said first key of said first plurality of keys, said first character in said input field presented by said touch screen display.

7. The method of claim 1, wherein said first character comprises a masked character.

8. The method of claim 1, wherein said first specified configuration settings are selected from a specified range of numerical settings associated with distances from edges of said touch screen display, and wherein said first specified configuration settings are selected by selecting numerical settings from said specified range of numerical settings using a virtual selection tool within said keyboard configuration menu.

9. The method of claim 1, wherein said first specified configuration settings are selected from discrete character defined settings associated with a skill level of said user, and wherein said first specified configuration settings are selected by selecting a first discrete character defined setting of said discrete character defined settings using a virtual selection tool within said keyboard configuration menu.

10. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

11. A computer program product, comprising a computer storage memory device storing a computer readable program code, said computer readable program code configured to perform the method of claim 1 upon being executed by a processor of said computing system.

12. A computing system comprising a processor coupled to computer-readable memory, said memory comprising a computer readable code configured to be enabled by the processor to perform the method of claim 1.

13. A method comprising:
receiving from a user, by a computer processor of a computing system comprising a touch screen display, a first enable command for enabling a keyboard configuration menu for a virtual touch screen keyboard presented by said touch screen of said computing system, said keyboard configuration menu comprising user adjustable configuration sensitivity settings and automatic adjustable configuration sensitivity settings for key proximity sensitivity settings associated with said virtual touch screen keyboard, wherein said automatic adjustable configuration sensitivity settings are configured to automatically adjust sensitivity levels of said sensitivity settings based on past user key selection corrections;
presenting, by said computer processor to said user via said touch screen display in response to said first enable command, said keyboard configuration menu;
receiving, by said computer processor from said user via said configuration menu, a first modify command for enabling a learning mode associated with first specified configuration settings associated with said key proximity sensitivity settings for each key of said virtual touch screen keyboard;
receiving, by said computer processor from said user via said configuration menu, first learning threshold settings associated with modifying said first specified configuration settings;
saving, by said computer processor, said first learning threshold settings; and
disabling, by said computer processor in response to said saving said first learning threshold settings, said keyboard configuration menu;
presenting, by said computer processor to said user via said touch screen display, said virtual touch screen keyboard;
receiving, by said computer processor from said user via said touch screen display, a first touch command for enabling a key of said virtual touch screen keyboard;
determining, by said computer processor, that a virtual keyboard assistance mode is enabled, said virtual keyboard assistance mode associated with assisting said user with enabling a correct key of said virtual touch screen keyboard;
determining, by said computer processor, a first learning threshold setting of said first learning threshold settings;
determining, by said computer processor, that said first touch command comprises a first ambiguous command associated with a first ambiguous zone, wherein said first ambiguous zone comprises an area on said touch screen display that is adjacent to said first plurality of keys and includes a portion of each key of said first plurality of keys, and wherein each said portion consists of an entire portion of each said key that completely surrounds but does not include a character on each said key;
logging, by said computer processor, a first sensitivity zone associated with said first learning threshold setting and said first touch command;
enlarging, by said computer processor, a first plurality of keys of said virtual touch screen keyboard, said first plurality of keys selected based on said first sensitivity zone and said first touch command;
receiving, by said computer processor from said user via said touch screen display in response to said enlarging, a first modified touch command associated with said first touch command;
logging, by said computer processor, said first modified touch command;
enabling, by said computer processor in response to said first modified touch command a first key of said first plurality of keys; and
placing, by said computer processor in response to said enabling said first key of said first plurality of keys, a first character in an input field presented by said touch screen display, said first character associated with said first key of said first plurality of keys.

14. The method of claim 13, further comprising:
enabling, by said computer processor, a usage analysis process associated with said virtual touch screen keyboard;
retrieving, by said computer processor, usage data comprising data associated with said first learning threshold settings, said first sensitivity zone, said first ambiguous zone, said first modified touch command, and said first touch command;
retrieving, by said computer processor, logged history data associated with key stroke corrections keystroke usage and past ambiguous zones for said virtual touch screen keyboard;
comparing, by said computer processor, said usage data to said logged history data;
generating, by said computer processor based on results of said comparing, a modified ambiguous zone; and
saving, by said computer processor, data associated with said modified ambiguous zone.

15. A computer program product, comprising a computer storage memory device comprising a computer readable program code, said computer readable program code configured to perform the method of claim 13 upon being executed by a processor of said computing system.

16. A computing system comprising a processor coupled to computer-readable memory, said memory comprising a computer readable code configured to be enabled by the processor to perform the method of claim 13.

* * * * *